Figure 1:
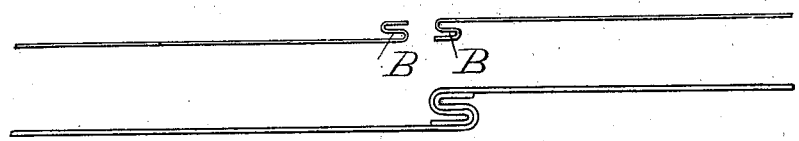

(No Model.)

E. J. DOLAN.
SEAM FOR SHEET METAL.

No. 376,817. Patented Jan. 24, 1888.

Witnesses
A. B. Blackwood
Elida C. Hough

Inventor
Edward J. Dolan
by Franklin H. Hough
Attorney

UNITED STATES PATENT OFFICE.

EDWARD J. DOLAN, OF PHILADELPHIA, PENNSYLVANIA, ASSIGNOR TO WILLIAM HACKER, TRUSTEE, OF SAME PLACE.

SEAM FOR SHEET METAL.

SPECIFICATION forming part of Letters Patent No. 376,817, dated January 24, 1888.

Application filed November 11, 1887. Serial No. 254,922. (No model.)

*To all whom it may concern:*

Be it known that I, EDWARD J. DOLAN, a citizen of the United States, residing at Philadelphia, in the county of Philadelphia and State of Pennsylvania, have invented certain new and useful Improvements in Seams for Sheet Metal; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the construction of seams for connecting the edges of sheet metal, and has for its object to generally improve in the construction of this class of seams and to provide a seam which may be rendered both air and water tight by applying solder upon but one face of the seam only, thus rendering its use particularly valuable in the construction of metallic cans which are intended for use in packing fruit or vegetables and in which the presence of solder upon the inside of the can is objectionable on account of its liability to poison or otherwise injure the contents of the can.

To these ends, and to such others as the invention may relate, the same consists in the peculiar construction of the seam, hereinafter described, shown in the drawings, and afterward defined in the claim.

Figure 2:
Figures 3, 4:
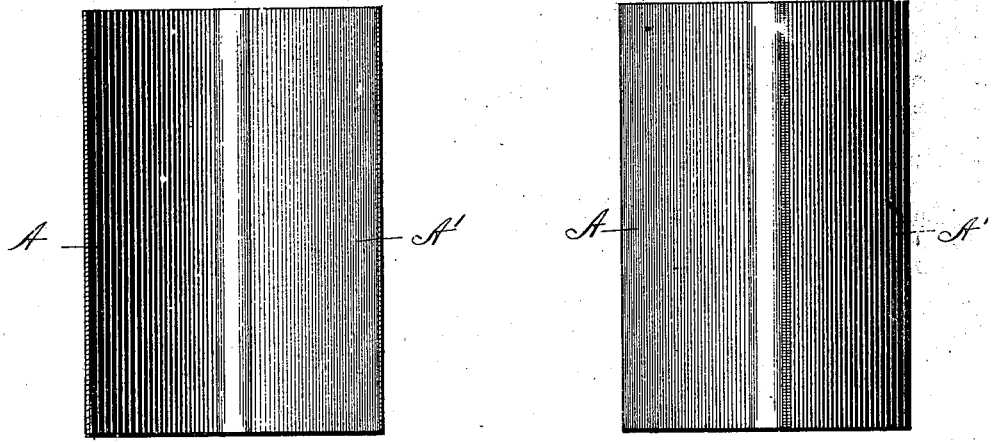

In the accompanying drawings, Figure 1 is an end view of two sections of sheet metal attached by my improved seam, which is shown in cross-section. Fig. 2 is a similar view in which the seam is shown as it appears after having been compressed. Fig. 3 is a plan view showing the seam after the solder has been applied. Fig. 4 is a similar view in which the opposite or unsoldered face of the seam is shown.

Referring, now, to the details of the drawings, A A' represent two separate pieces of sheet metal. The adjacent edges of each are bent so as to form a double curve or S, as shown at B B. These edges are hooked or connected together, as shown in Fig. 1 of the drawings, and the seam thus formed is afterward flattened by passing between suitable rollers or dies. It will be observed that a seam constructed in this manner will be much more strong and durable than the ordinary lock-seam, the same being doubled and the edges of the tin fully protected. A seam of this kind may be rendered perfectly tight by applying solder to one of its faces only.

Having thus described my invention, what I claim to be new, and desire to secure by Letters Patent, is—

The herein-described seam for sheet-metal cans, consisting of the two adjacent S-shaped folds B B, interlocked, as described, and provided with a covering or coating of solder upon one of the faces of the seam, substantially as described.

In testimony whereof I affix my signature in presence of two witnesses.

EDWARD J. DOLAN.

Witnesses:
JOHN MÖLLER,
J. C. MÖLLER.